May 13, 1947. A. E. W. JOHNSON ET AL 2,420,543
DUAL CORN HUSKING UNIT FOR MULTIPLE ROW CORN PICKERS
Filed May 27, 1944 5 Sheets-Sheet 1
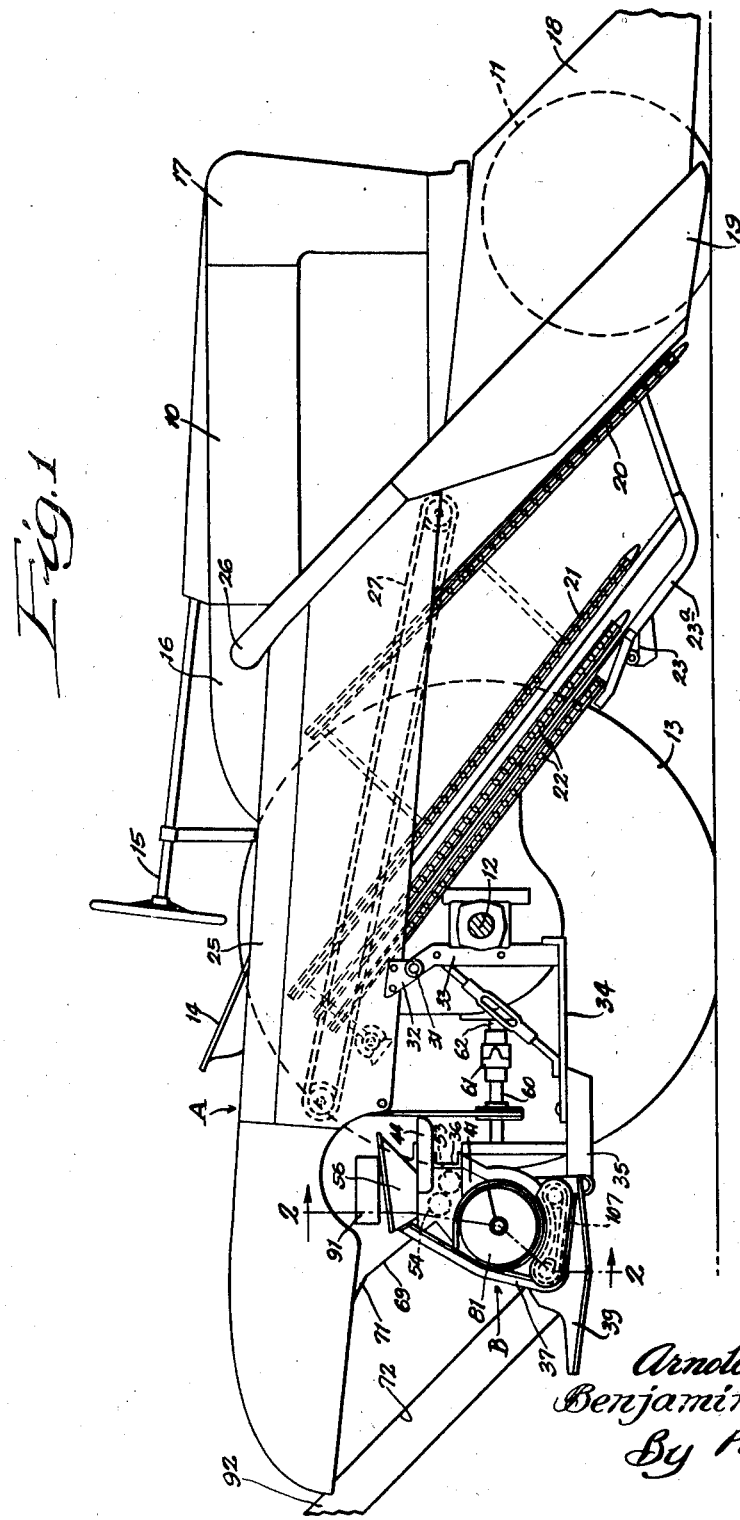
Inventors:
Arnold E. W. Johnson,
Benjamin M. Hyman.
By Paul O. Pippel.
Attorney.

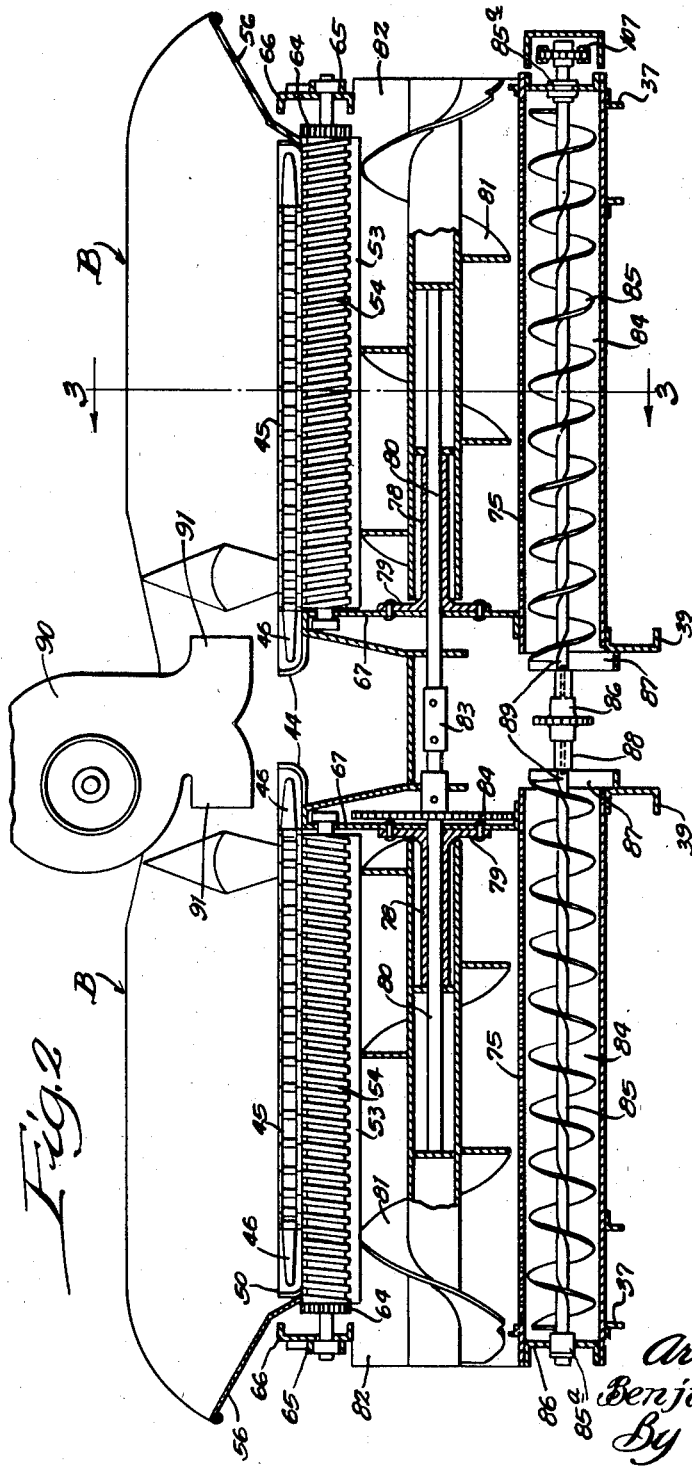

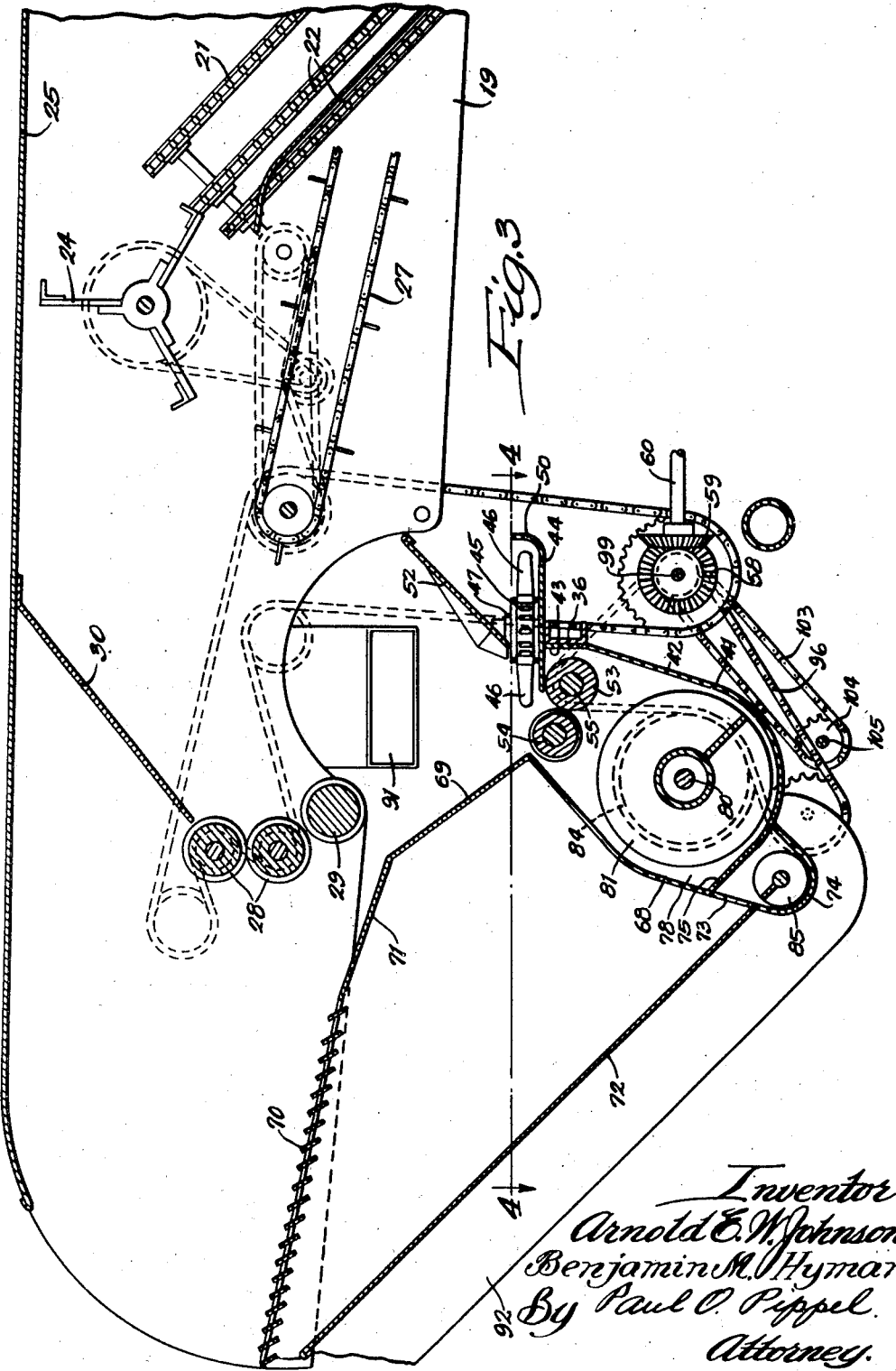

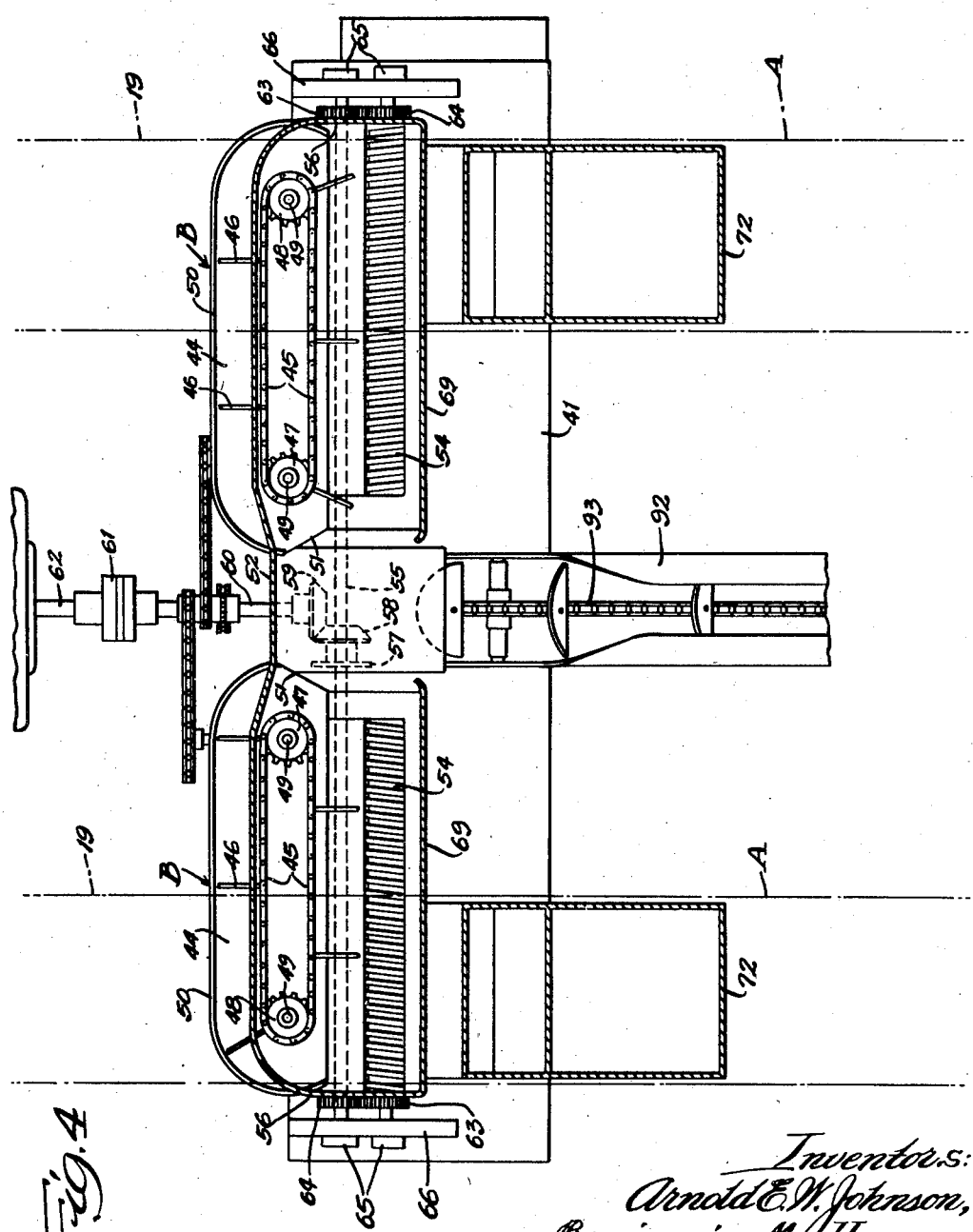

May 13, 1947. A. E. W. JOHNSON ET AL 2,420,543
DUAL CORN HUSKING UNIT FOR MULTIPLE ROW CORN PICKERS
Filed May 27, 1944 5 Sheets-Sheet 5
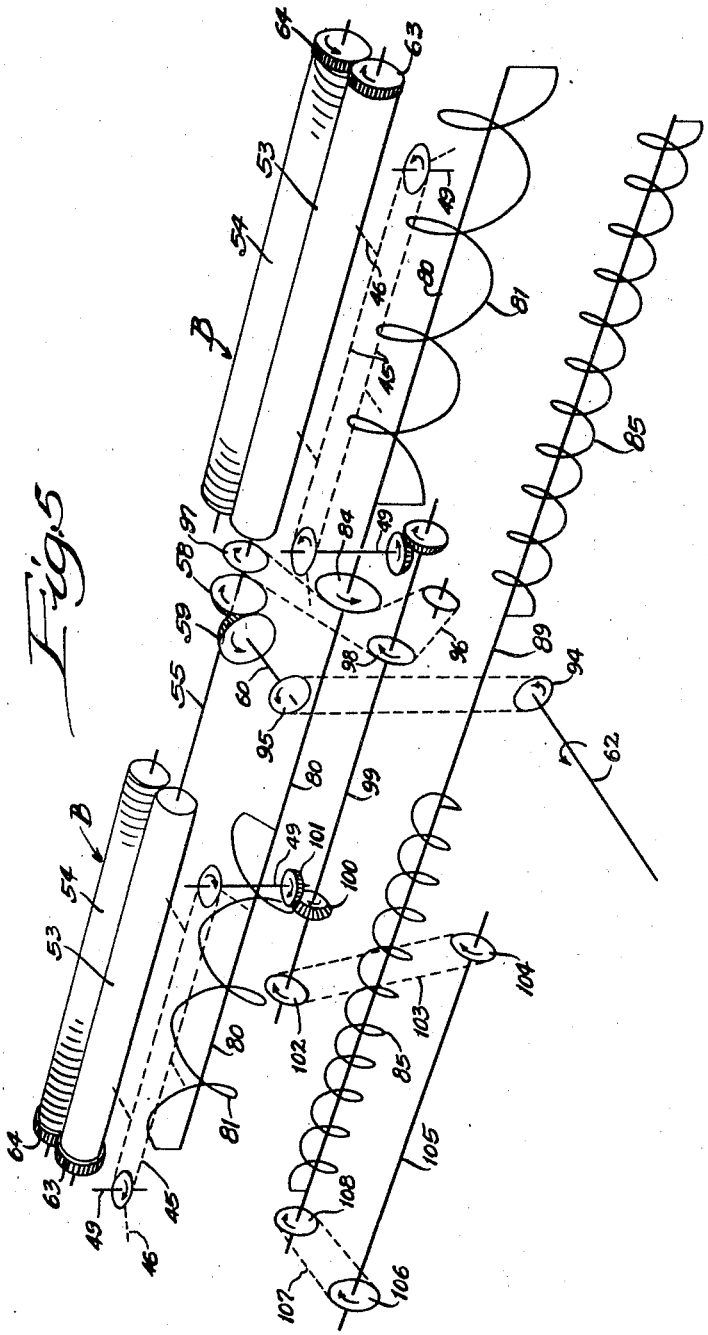
Inventors:
Arnold E. W. Johnson,
Benjamin M. Hyman
By Paul O. Pippel
Attorney Patented May 13, 1947

2,420,543

UNITED STATES PATENT OFFICE 2,420,543

DUAL CORNHUSKING UNIT FOR MULTIPLE ROW CORN PICKERS

Arnold E. W. Johnson, Oak Park, and Benjamin M. Hyman, Moline, Ill., assignors to International Harvester Company, a corporation of New Jersey Application May 27, 1944, Serial No. 537,719

9 Claims. (Cl. 130—5)

This invention relates to a corn harvester. More specifically it relates to a husking mechanism for a field type of self-propelled corn harvester.

In recent years, the corn harvester, harvesting and picker attachments have been designed for attachment directly on tractors to be propelled thereby, the mechanism of the harvester being driven by a power derived from the power plant of the tractor. With the tricycle type of tractors, corn pickers have been developed which consist of two substantially independent harvesting units mounted at the sides of the tractor, the harvested crop being delivered rearwardly over the rear axle of the tractor.

There are two general types of tractor mounted pickers classified as to their principles of operation: The snapper type of gathering device as shown in U. S. Patent No. 2,011,925 is provided with downwardly inclined snapping rolls and ear lifting means alongside the snapping means. The ears are delivered upwardly and rearwardly over the axle usually to a husking device. Another type of corn harvester is shown in application Serial No. 531,362, filed April 17, 1944, which cuts the stalks and delivers them rearwardly over the rear axle, the ears being snapped from the stalks adjacent the axle. The ears may then be dropped into a husking device.

The principal object of the present invention is to provide an improved husking device to be mounted at the rear of a tractor.

A more specific object is to provide a husking device particularly adapted for receiving snapped ears of corn discharged from two gathering units at the rear of and above the rear axle of a tractor.

Another specific object is to provide a husking device having horizontal husking rolls with forwarding means delivering from the end to the center thereof.

Another subsidiary object is to provide alined sets of husking rolls driven from the center and discharging husked ears to the center.

Another principal object is the provision of a husk eliminating and shelled grain saving device below substantially horizontal husking rolls.

A more specific object is the provision of open end auger husk eliminating devices having a central mounting location and extending outward beneath alined sets of husking rolls.

Another object is the provision of outwardly delivering husk eliminating augers in combination with inwardly delivering ear husking means and inwardly delivering shelled grain delivering means.

The above objects and others which will be apparent from the detail description to follow are accomplished by a construction such as illustrated in the drawings, in which:

Figure 1 is a side elevation of a tractor mounted corn harvester with one wheel removed to better view the mechanism of the harvester;

Figure 2 is a transverse vertical section taken substantially on the line 2—2 of Fig. 1;

Figure 3 is a longitudinal vertical section taken on the line 3—3 of Fig. 2;

Figure 4 is a horizontal section taken on the line 4—4 of Fig. 3; and

Figure 5 is a diagrammatic perspective view illustrating a suitable drive mechanism for the husker unit of the invention.

As illustrated, the harvester embodying the invention consists in combination with a well known tricycle type of farm tractor of a pair of harvesting units A, a husking unit B, and suitable frame structure for connecting these units to the tractor. Either type of gathering and snapping means may be utilized, it being only necessary to deliver snapped ears rearwardly and above the rear axle to the husking unit in which the invention resides. As illustrated diagrammatically, the gathering and snapping units B are of the cutter type. The tractor, as illustrated, has a narrow body 10, a front rolling support 11, a wide rear axle structure 12, and traction wheels 13. An operator's station 14, a steering device 15, a fuel tank 16, and a hood and radiator structure 17 are also illustrated.

As the tractor is driven through the field with adjacent rows passing alongside the tractor body, the stalks are gathered between a gathering device 18 mounted at the front of a tractor and gathering means 19 carried by the units A. Gathering chains 20, 21, and 22 engage the stalks as they are severed by a knife or sickle 23 mounted for reciprocation on frame structure 23ᵃ which is a part of each unit A. The stalks are carried upwardly, butts first, passing under a forwarding device 24 mounted on a horizontal axis at the upper end of the chains 21 and 22. Said device may be carried by any suitable frame structure which forms a part of unit A and which may be identified by the reference character 25 which identifies the housing structure extending along the upper portion and along both sides of the picker units A. As the stalks are carried upward they engage a rounded shield or deflector 26 at the forward portion of the housing 25 and drop into a somewhat horizontal position onto a conveyor 27. Said conveyor is best illustrated in Figure 3 and shown in dotted lines in Figure 1. The forwarding device 24 and the conveyor 27 carry the stalks rearwardly to horizontal snapping rolls 28. The stalks passing between the rolls and the ears being snapped therefrom drop downwardly to the husking unit B. A roll 29 is illustrated for assisting in feeding the stalks to the snapping rolls 28. A deflecting shield 30 is provided for delivering the stalks into the vicinity of the husking rolls. As above stated, the gathering and snapping means, as illustrated diagrammatically, show the cutter type of device in which the stalks are first severed and elevated to a position at which the ears are snapped. It will be understood, however, that the other type of snapper unit may be utilized in which the ears are snapped from standing stalks and delivered rearwardly of the tractor. In either case, the ears are dropped into the receiving portion of the husking means B.

The harvester units A are substantially identical at each side of the tractor, one being opposite with respect to the other. These units may be mounted for floating movement or for adjustment rearwardly of the tractor. One point of connection has been illustrated in the form of a transverse horizontal pivot 31 formed by brackets 32 on the unit A and attaching structure 33 rigidly secured to the rear axle housing 12 of the tractor. A drawbar 34, which is also rigidly connected to the attaching structure, extends rearwardly therefrom to provide means for supporting the harvester unit B in position at the rear of the tractor.

The husking unit B is rigidly supported by a supporting frame structure on the drawbar 34. Said frame structure includes horizontal rearwardly extending members 35 rigidly connected to the drawbar 34. Another principal member of the frame structure is a channel member 36 extending transversely of the tractor a substantial distance vertically of the members 35. An angle bar 37, as shown in Figure 1, extending around the rear portion of the husking unit and across the bottom thereof provides another principal member of the frame structure. It is to be understood that one of the angle bars 37 is positioned at each end of the husking unit structure as shown in Figure 2. Spaced channel members 39, as shown in Figure 2, also constitute part of the frame structure. In general, the husking unit is of the combined frame structure and wall supported type, the sheet metal which forms the housings and other parts of the structure being of sufficient thickness to form a unitary structure in combination with relatively few structural members such as the angle bars and channel members referred to by reference characters.

The frame structure of the husking unit B is merely a housing and supporting means and has no significance in connection with the operating elements and compartments of the husking unit. A sheet metal housing 41 extends transversely entirely across the rear of the tractor and forms the basic structure for the entire assemblage of elements making up the husker. Tangentially extending wall 42 extending upwardly from the lower portion of the housing 41 joins with a vertical wall 43 terminating adjacent a horizontal table member 44. An ear forwarding chain 45 having ear elements 46 thereon operates above said table member 44. As best shown in Figure 4, said chain which is located at each side of the husking units operates on sprockets 47 and 48. Said sprockets are carried by vertical shafts 49 which are indicated in the schematic view of Figure 5, the shafts adjacent the center of the husker being power input shafts for driving the ear forwarding chains. An upstanding wall 50 around the table member 44 retains shelled grain and sections of ears which may be carried around with the forwarding chain assuring that such recovered material is delivered at the central end 51 along with the husked ears. A deflector member 52, terminating at its lower end adjacent the gathering chains 45, extends forwardly and upwardly to form one side of a hopper for receiving ears snapped from the snapping rolls 28 and dropped downwardly therefrom.

A set of husking rolls is mounted on each end of the husking unit, each set consisting of a roll 53 alined adjacent the terminal edge of the table 44 and a roll 54 adjacent the roll 53 and on a level slightly higher than said roll. The rolls 53 are in alinement and are carried by the same shaft 55 so that, in fact, a single horizontal husking roll structure is provided. The rolls 54 are also in axial alinement with each other and could be considered as a roll structure extending substantially across the husking unit. The rolls 53 and 54 may be rotatably mounted by any suitable supporting structure on the husking unit. Referring to Figure 4, an end wall 56 is indicated, beyond which the shafts carrying the rolls extend. Intermediate the rolls 53, the shaft 55 is journaled on a support 57 which is indicated in Figure 4. A bevel gear 58 secured to the shaft adjacent said support meshes with a bevel gear 59 carried on a shaft 60 which extends rearwardly and is joined by means to be hereinafter described, including a flexible shaft 61 to a power take-off shaft 62 extending from the rear axle structure of the tractor. Meshing gears 63 and 64 on the ends of the husking roll shafts outside the walls 56 provide for driving the rolls 54 from the rolls 53. As shown in Figure 2, the shafts of the rolls 54 are journaled in members 65 carried by longitudinal extending channel shaped members 66 which are a part of the frame structure of the husking unit.

Figure 2 shows vertically extending walls 67 in which the inner ends of the shaft carrying the husking rolls 54 are journaled. Said walls 67 extend downwardly being connected to the housing structure 41 which has been previously described.

The lower portion of the curved housing 41 extends rearwardly and upwardly being connected to a wall 68. The wall 68 connected to the rear portion of the housing 41 curves around the rear portion of the housing and upwardly to a point adjacent the rear husking roll 54. A wall 69 extends rearwardly and upwardly from the upper end to a wall 71. Said wall is substantially horizontal being slightly inclined in an upward direction and connected to a perforated grid 70. Said grid extends rearwardly to a downwardly inclined wall 72. Said wall joins with an extension of the wall 68, an opening 73 being provided for the flow of shelled grain recovered through the grid 70. The wall 68 continues to form a substantially cylindrical compartment 74 in which grain moving means is positioned. A portion 75 of the housing 41 is perforated to provide means for the recovery of shelled grain from the husks being moved through the housing 41.

As best shown in Figure 2, a pair of sleeves 78 having flanges 79 at one end thereof are attached to the end walls 67. Said sleeves provide journals for shafts 80 which carry open end auger structures 81 within the husk compartments 78. The augers extend from adjacent the end walls 67 and terminate at the open ends 82 of the husk compartments. It will be noted that the flights on the augers are in opposite directions whereby the entire husk eliminating structure can be rotated in the same direction with each auger discharging husks from the central portion of the husking unit to the opposite sides thereof.

The shafts 80 are connected together by a sleeve 83 so that they may be driven in unison by a sprocket 84 mounted on one of the shafts.

A pair of auger conveyors 85 are mounted in the shelled grain compartments 74. Said augers are journaled at their outer ends in members 85ª which close the outer ends of the compartments. At their inner ends, the augers are connected together by a sprocket member 86, the ends of the augers being journaled in brackets 87. The sprocket 86 is for the purpose of driving an elevator conveyor as will be hereinafter described. Said sprocket is carried by a sleeve 88 into which shaft ends 89 of the augers are slidably keyed. By moving the augers endwise the sleeve 88 may be moved with the elevator structure.

A blower fan 90 is mounted on the husking unit above the husking rolls with oppositely directed discharge conduits 91 arranged to deliver blasts of air over the husking rolls adjacent the center of the husking unit to the sides thereof. Said blasts of air pass in a direction opposite to the direction of travel of the ears being husked as carried by the conveyor chains 45. The end walls 50, previously referred to, slant upwardly and outwardly beyond the husking rolls and beyond the point at which snapped corn is delivered thereto. Said walls act to provide a hopper and will provide an egress for stalks, shucks, and other trash which is at times delivered with the snapped ears. The blast is delivered not only along the husking rolls, but transversely of the material being dropped downwardly from the snapping means. The blast of air is particularly effective as it engages the falling material and moves it outwardly before it has become engaged with the fallen ears of corn and the husking rolls.

An elevator 92 is shown mounted at the rear of the husking unit extending rearwardly and upwardly therefrom. Said elevator contains a conveyor 93 which is driven by the sprocket 86 as previously described.

Figure 5 is a schematic view illustrating a drive which may be utilized for operating the moving parts of the husking device as described. From the tractor power take-off shaft 62, the diagram shows power being delivered through a sprocket 94 to a sprocket 95 which is secured to the shaft 60.

The diagram of Figure 5 also shows the augers 81 and their driving shafts 80 which are indicated as a continuous alined structure. The sprocket 84 which is mounted on one of the shafts 80 is illustrated as being driven by a chain 96 which engages a sprocket 97 on the shaft 55 which carries the husking rolls 53. The chain 96 also passes over a sprocket 98 on a shaft 99. Said shaft 99 through bevel gears 100 and 101 operates the vertical shafts 49 at one end of the conveyor chains 45 thereby driving said chains in opposite directions. A sprocket 102 on the shaft 99 drives a chain 103 which operates over a sprocket 104 on a shaft 105. Said shaft carries another sprocket 106 which drives a chain 107 for operating a sprocket 108 on one of the shelled grain augers 85. The chain 107 also shows in Figure 2 and also in dotted lines in Figure 1. This completes the diagram showing a suitable driving mechanism for the husking rolls, the ear conveying chains, the husk eliminating augers and shelled grain conveying augers. It will be understood that any other conventional mechanism may be utilized for driving these elements. The diagram was shown to illustrate driving mechanisms in order to properly show the inter relation of the different moving parts of the husking unit.

The operation of the improved husking device as above described has been explained in connection with the description of the component parts. Said device is essentially a complete self-contained unit which may be readily mounted on or removed from the rear end of a tractor, being carried on the drawbar as illustrated or by other equally detachable means secured to the rear axle structure of the tractor. The unit is particularly designed for two-row tractor mounted pickers in which the snapped corn, gathered from adjacent rows, is delivered at spaced locations rearwardly of and above the rear axle structure of the tractor. By providing a horizontal husking roll structure, the supporting and driving of the rotating elements thereof is accomplished by a simplified and compact drive mechanism. The husking roll structure, as illustrated, is preferably divided into two sections, each of which has been described as a set of husking rolls, although the structure may be considered as a unitary one extending in a horizontal direction transversely of the tractor entirely across the husking roll unit. The drive mechanism as applied at the center of the husking roll structure, between the adjacent ends of the two sets of husking rolls, requires a minimum number of driving parts and is in an ideal location for receiving power from the tractor power take-off.

The provision of a center section for the reception of husked ears and shelled grain also makes possible the novel construction of the husk eliminating device by utilizing a centrally locating shaft structure driven by a single drive means at the center of the husking unit. Two open end augers are utilized which discharge the husks through open end compartments laterally of the husking unit at each side thereof. The use of shelled grain conveying augers cooperates in a structural simplified manner with the husk eliminating means to return the shelled grain to the center of the husking unit. It is to be understood that the applicants have shown and described only a preferred embodiment of their improved husking device and that they claim as their invention all modifications falling within the scope of the appended claims.

What is claimed is:

1. A husking unit adapted to be positioned on a tractor at the rear thereof for receiving snapped corn from two spaced snapping means comprising a frame structure extending transversely across the rear of the tractor, two sets of husking rolls mounted on said structure and extending transversely of the tractor, means for driving said rolls, ear conveyor means above each set of rolls for moving ears from the outside ends to the center, a husk-receiving chamber under each set of husking rolls open at its outer end for the discharge of husks, a transverse drive shaft extending into each of said chambers, means to drive said shaft adjacent its central portion, husk-conveying means mounted on each end of said shaft under the husking rolls, a shelled-corn saving grid beneath each husk conveying means in the bottom of the husk-receiving chamber, a shelled corn receiving compartment beneath each grid, a conveyor in each of said compartments driven to advance grain to the center of the husking unit, and an ear and grain receiving compartment at the center of the husking unit for receiving ears from the husking rolls and shelled grain from the conveyors.

2. A husking unit adapted to be positioned on a tractor at the rear thereof for receiving snapped corn from two spaced snapping means comprising a frame structure extending transversely across the rear of the tractor, two sets of husking rolls mounted on said structure and extending transversely of the tractor, means for driving said rolls, ear conveyor means above each set of rolls for moving ears from the outside ends to the center, a husk-receiving chamber under each set of husking rolls open at its outer end for the discharge of husks, a central drive shaft extending into each of said chambers, and open end husk conveying augers mounted on each end of said shaft under the husking rolls.

3. A husking unit adapted to be positioned on a tractor at the rear thereof for receiving the snapped corn from two spaced delivery means comprising a frame structure extending transversely across the rear of the tractor, two aligned sets of husking rolls on said structure extending transversely of the tractor, means for driving said rolls, an ear conveyor chain above each set of rolls for moving ears from the outside ends to the center, a husk-receiving chamber under each set of husking rolls open at its outer end for the discharge of husks, transverse drive shaft portions extending from the center into each of said compartments, an open end husk-conveying auger mounted on each of said portions under the husking rolls, a perforate shelled-corn saving grid beneath each auger in the wall of the husk-receiving chamber, a shelled-corn receiving compartment beneath each grid, a conveyor auger in each of said compartments driven to advance shelled grain to the center of the husking unit, and an ear and grain receiving compartment at the center of the husking unit for receiving ears from the husking rolls and shelled grain from the conveying augers.

4. A husking unit adapted to be positioned on a tractor at the rear thereof for receiving the snapped corn from devices operating on two spaced rows comprising a frame structure extending transversely across the rear of the tractor and adapted to be removably mounted on the rear axle structure thereof, a husking roll structure extending entirely across said structure transversely of the tractor, ear conveying means above said roll structure for moving ears from the outside ends to the center, a husk-receiving chamber under each end of the husking roll structure open at its outer end for the discharge of husks, drive shaft portions extending from the center into each of said compartments, and an open end husk-conveying auger mounted on each of said portions.

5. A husking unit adapted to be positioned on a tractor at the rear thereof for receiving the snapped corn from devices operating on two spaced rows comprising a frame structure extending transversely across the rear of the tractor and adapted to be removably mounted on the rear axle structure thereof, a husking roll structure extending entirely across said structure transversely of the tractor, ear conveying means above said roll structure for moving ears from the outside ends to the center, a husk-receiving chamber under each end of the husking roll structure open at its outer end for the discharge of husks, transverse drive shaft portions extending from the center into each of said compartments, an open-end husk-conveying auger mounted on each of said portions, a perforate shelled-corn saving grid beneath each auger in the wall of the husk-receiving chamber, a shelled-corn receiving compartment beneath each grid, a conveyor auger in each of said compartments driven to advance shelled grain to the center of the husking unit, and an ear and grain receiving compartment at the center of the husking unit for receiving ears from the husking rolls and shelled grain from the conveying augers.

6. A husking unit adapted to be positioned on a tractor at the rear thereof for receiving the snapped corn from two spaced snapping devices comprising a frame structure extending transversely across the rear of the tractor and adapted to be removably mounted on the rear axle structure thereof, two pairs of aligned husking rolls mounted on said frame structure and extending transversely of the tractor, means for driving said rolls from the central adjacent ends thereof, an ear conveyor chain above each set of rolls for moving ears from the outside ends to the center, a husk-receiving chamber under each set of husking rolls open at its outer end for the discharge of husks, a central drive shaft extending from the center into each of said compartments, an open-end husk-conveying auger mounted on each end of said shaft under the respective husking rolls, said augers discharging in opposite direction and towards their outer ends when driven in the same direction, a perforate shelled-corn saving grid beneath each auger in the wall of the husk-receiving chamber, a shelled-corn receiving compartment beneath each grid, a conveyor auger in each of said compartments driven to advance shelled grain to the center of the husking unit, and an ear and grain receiving compartment at the center of the husking unit for receiving ears from the husking rolls and shelled grain from the conveying augers, and an elevator positioned to receive the material in said compartment.

7. A husking unit adapted to be positioned on a tractor at the rear thereof for receiving the snapped corn from two spaced discharging means comprising a frame structure extending transversely across the rear of the tractor, two pairs of axially aligned husking rolls mounted on said frame structure, two of the axially aligned rolls being spaced apart at their inner and central ends to provide for the free discharge of husked ears downwardly therebetween, means for driving said rolls, and an ear conveyor chain above each set of rolls for moving ears from the outside ends to the center.

8. A husking unit adapted to be positioned on a tractor at the rear thereof for receiving the snapped corn from two spaced discharging means comprising a frame structure extending transversely across the rear of the tractor, two pairs of axially aligned husking rolls mounted on said frame structure, two of the axially aligned rolls being secured together at their adjacent and central ends, the other two of said rolls being spaced apart at their inner and central ends to provide for the free discharge of husked ears, a single means for driving said rolls, and an ear conveyor chain above each set of rolls for moving ears from the outside ends to the center.

9. A husking unit adapted to be positioned on a tractor at the rear thereof for receiving snapped corn from two spaced snapping means comprising a frame structure extending transversely across the rear of the tractor, two sets of husking rolls mounted on said structure and extending transversely of the tractor, means for driving said rolls, ear conveyor means above each set of rolls for moving ears from the outside ends to the center, a husk-receiving chamber under each set of husking rolls open at its outer end for the discharge of husks, a central drive shaft extending into each of said chambers, a driving element mounted on said shaft intermediate its ends, and husk conveying augers mounted on each end of said shaft under the husking rolls.

ARNOLD E. W. JOHNSON.
BENJAMIN M. HYMAN.

REFERENCES CITED

The following references are of record in the file of this patent:

UNITED STATES PATENTS

| Number | Name | Date |
| --- | --- | --- |
| 1,925,077 | Lindgren | Aug. 29, 1933 |
| 1,940,851 | Everett | Dec. 26, 1933 |
| 2,290,700 | Morrol | July 21, 1942 |
| 2,298,198 | Coultas | Oct. 6, 1942 |
| 2,210,973 | Coultas | Aug. 13, 1940 |
| 879,405 | McInturf | Feb. 18, 1908 |
| 1,471,616 | Leister | Oct. 23, 1923 |